May 13, 1924.                              1,493,901
B. F. SEYMOUR
COMBINED RESILIENT BEARING AND TRANSMISSION
Filed Sept. 28, 1921
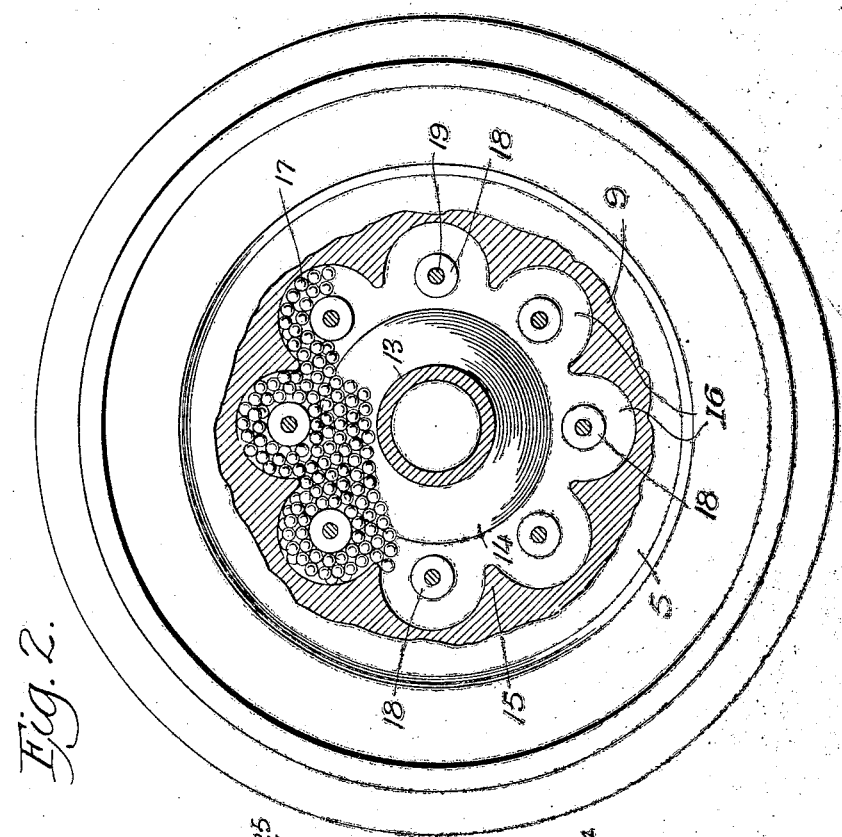
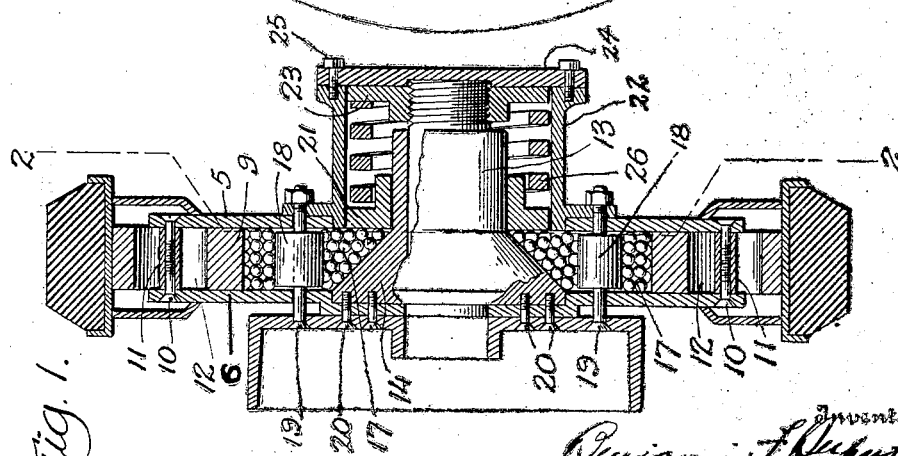

Patented May 13, 1924.

1,493,901

UNITED STATES PATENT OFFICE.

BENJAMIN F. SEYMOUR, OF WASHINGTON, DISTRICT OF COLUMBIA.

COMBINED RESILIENT BEARING AND TRANSMISSION.

Application filed September 28, 1921. Serial No. 503,801.

*To all whom it may concern:*

Be it known that I, BENJAMIN F. SEYMOUR, a citizen of the United States, residing at Washington, in the District of Columbia, have invented certain new and useful Improvements in Combined Resilient Bearings and Transmissions, of which the following is a specification.

The present invention relates to resilient transmission and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The present disclosure is proposed as an improvement over the type of resilient transmission and bearing set forth in my co-pending application, Serial No. 302,416, filed June 7, 1919, and Serial No. 310,970, filed July 15, 1919.

The present invention is characterized in that a plurality of anti-friction balls are interposed between the respective engaging or wedge elements of the hub and rim wheel portions, and the compressible resilient element per se, and have for their function to transmit all movements between the hub and wheel rim portions.

The invention is shown by way of illustration in the accompanying drawings wherein—

Figure 1 is a transverse sectional view showing the application of the device to a vehicle wheel.

Fig. 2 a side elevational view thereof partly in section taken on the line 2—2 of Figure 1.

Referring to the construction in further detail and wherein like reference characters designate corresponding parts, the construction consists of a hub formed with two side plates or housing members 5 and 6, which are disposed against the inner rim portion 9 of the wheel, as shown. The two hub members 5 and 6 are secured to the wheel rim by a series of pairs of bolts 10 screwed into threaded sleeves 11 which serve as spacing elements and which are located within the spacing chambers 12, as indicated.

It will be understood, of course, that said spaces 12 are provided to permit the wheel rim to have limited radial movement with respect to the axis or hub 13 of the wheel.

The resilient transmission bearing device per se is provided by the inner part of the rim portion 9 which is constructed with a lobed or irregular periphery 15 to form semi-annular spaces 16 for containing a plurality of relatively small steel balls 17, which coact with a plurality of projections 18, preferably of cylindrical construction, and which serve in the capacity of drivers. The several drivers 18 are mounted on the side plates 5 and 6 by the bolts 19 and are arranged in annular relation and at equal distances apart. Said drivers 18 are located in concentric relation to the several chambers 16 in the normal setting of the wheel, but operate to change with respect thereto, as under the initial driving action or relative movement between the wheel rim and hub, (the relation is eccentric), thereby producing cooperable engaging or wedge elements for the purpose stated.

A cone 14 surrounds the hub portion 13, and is disposed against the side plate 6 and suitably secured thereto by the several bolts 20, or by any other fastening means. The face of the cone coacts with the several balls 17 to project the same laterally against the resiliently seated collar 21 mounted to have limited axial movement on the cone portion 13 within the annular space provided by the housing member 22. A second stationary collar 23 is screwed on the hub portion 13 and seats against the end plate 24, as shown. Said end plate is secured by the several bolts 25 for obvious reasons. A spring 26 within the housing member 22 seats against the stationary collar 23 and the movable collar 21 as shown.

It will therefore be seen from the foregoing that any turning movement of the hub portion will impart a like movement to the rim portion through the instrument of the several drivers 18, the rim periphery 15 and the balls 17 interposed therebetween. And it will be further seen that any shock or jarring motion imparted to the wheel rim will, through the same instruments, be taken up and dissipated against the resiliency of the spring 26.

It is obvious that those skilled in the art may vary the details of construction and arrangement of parts without departing from the spirit of my invention, and, therefore, I do not wish to be limited to such features except as may be required by the claims.

Having thus described my invention, what I claim is:

1. In a combined resilient bearing and transmission for vehicle wheels, the combination of a driving hub portion, a driven rim portion mounted to have limited radial and angular movements on said hub portion, wedge elements mounted on said hub and rim portions, respectively, a plurality of relative inter-acting mobile elements interposed between the hub and rim portions and cooperable with said wedge elements, and a resilient element cooperable with said mobile elements, substantially as described.

2. In a combined resilient bearing and transmission for vehicle wheels, the combination of a driving hub portion, a driven rim portion mounted to have limited radial and angular movements on said hub portion, wedge elements mounted on said hub and rim portions, respectively, a plurality of relatively hard and mobile elements filling the space between the hub and rim portions, and a resilient element cooperable with said mobile elements, substantially as described.

3. In a combined resilient bearing and transmission for vehicle wheels, the combination of a hub portion having driving elements and a cone element, a driven rim portion mounted to have limited radial and angular movements on said hub portion, said rim portion having projecting elements on its inner periphery, a plurality of balls interposed between said projecting elements and said driving elements, and a compressible collar holding the balls under tension against said cone element, substantially as described.

4. In a combined resilient bearing and transmission for vehicle wheels, the combination of a hub portion having driving elements, a driven rim portion mounted to have limited radial and angular movements on said hub portion, said rim portion having projecting elements on its inner periphery, a plurality of balls interposed between said projecting elements and said driving elements, a cone element mounted on the hub, a collar mounted to have axial movement on the hub and operable through the instruments of said driving elements and said balls, and a resilient abutment for said collar, substantially as set forth.

5. In a combined resilient bearing and transmission for vehicle wheels, the combination of a hub portion, a rim portion mounted to have limited radial and angular movements on said hub portion, said rim portion having its inner periphery constructed to provide a plurality of projecting elements, a plurality of driving elements mounted on said hub portion, a plurality of balls interposed between said inner periphery and the driving elements, a cone element mounted on the hub portion adapted to laterally deflect said balls, a collar mounted to have limited axial movement on the hub portion cooperable with said balls, and a resilient abutment for said collar, substantially as set forth.

6. In a combined resilient bearing and transmission for vehicle wheels, the combination of a hub portion having side plates, a rim portion mounted to have limited radial and angular movements between said side plates, said rim portion having its inner periphery formed to provide a series of semi-circular surfaces, a plurality of driver elements secured to the hub and cooperable with said surfaces, respectively, a plurality of balls interposed between said cooperating elements, a cone element operable to axially deflect said balls, and a compressible collar mounted on the hub and cooperable with said balls and the cone element, substantially as set forth.

7. In a combined resilient bearing and transmission for vehicle wheels, the combination of a hub portion having side plates, a rim portion mounted to have limited radial and angular movements between said side plates, a cone element having a cylindrical portion mounted on the hub portion, wedge elements mounted on the rim portion, a spring tensioned collar mounted on said cone cylindrical portion, and a plurality of relatively small mobile elements filling the space between said wedge elements, the cone element, and said tensioned collar for the purpose set forth.

In testimony whereof I affix my signature.

BENJAMIN F. SEYMOUR.